US008467962B2

(12) United States Patent (10) Patent No.: US 8,467,962 B2
Irie et al. (45) Date of Patent: Jun. 18, 2013

(54) NAVIGATION SYSTEM AND LANE INFORMATION DISPLAY METHOD

(75) Inventors: Takashi Irie, Tokyo (JP); Naomiki Komatsu, Tokyo (JP); Yoshiki Akashi, Tokyo (JP); Kumi Nishibashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 958 days.

(21) Appl. No.: 12/528,329

(22) PCT Filed: Dec. 3, 2007

(86) PCT No.: PCT/JP2007/073323
§ 371 (c)(1),
(2), (4) Date: Aug. 24, 2009

(87) PCT Pub. No.: WO2008/117495
PCT Pub. Date: Oct. 2, 2008

(65) Prior Publication Data
US 2010/0017117 A1 Jan. 21, 2010

(30) Foreign Application Priority Data
Mar. 23, 2007 (JP) .................................. 2007-077193

(51) Int. Cl.
*G01C 21/30* (2006.01)
*G01C 21/32* (2006.01)

(52) U.S. Cl.
USPC .......... 701/431; 701/437; 701/409; 701/428; 340/995.19; 340/995.2

(58) Field of Classification Search
USPC ................. 701/532–533, 400, 431, 437, 409, 701/428; 340/990, 995.1, 995.19, 995.2
See application file for complete search history.

(56) References Cited

U.S. PATENT DOCUMENTS 5,206,811 A * 4/1993 Itoh et al. ...................... 701/428
5,874,905 A * 2/1999 Nanba et al. ............... 340/995.2
(Continued)

FOREIGN PATENT DOCUMENTS

JP 11-94582 A 4/1999
JP 2000-251197 A 9/2000
(Continued)

OTHER PUBLICATIONS

Analysis of drivers' preparatory behaviour before turning at intersections; Sato, T.; Akamatsu, M.; Intelligent Transport Systems, IET vol. 3, Issue: 4; Digital Object Identifier: 10.1049/iet-its.2008.0099; Publication Year: 2009, pp. 379-389.*

(Continued)

*Primary Examiner* — Cuong H Nguyen
(74) *Attorney, Agent, or Firm* — Birch, Stewart, Kolasch & Birch, LLP

(57) ABSTRACT

A navigation system includes a lane information acquiring unit 27 for acquiring both the number of lanes of a road which forms an intersection, and lane information which defines a road branching off from each of the lanes, a lane direction determining unit 28 for determining the direction of each of the lanes on the basis of both the lane information acquired by the lane information acquiring unit, and a road attribute of an incoming road coming into the intersection and a road attribute of an outgoing road extending from the intersection, the road attributes of the incoming and outgoing roads being included in map data acquired by a map data acquiring unit, and a lane information display unit 29 for displaying the direction of each of the lanes determined by the lane direction determining unit with an arrow.

10 Claims, 12 Drawing Sheets

U.S. PATENT DOCUMENTS

| | | | | |
|---|---|---|---|---|
| 5,893,898 | A * | 4/1999 | Tanimoto | 701/437 |
| 5,938,718 | A * | 8/1999 | Morimoto et al. | 701/431 |
| 6,108,604 | A * | 8/2000 | Fukaya et al. | 701/428 |
| 6,415,222 | B1 * | 7/2002 | Sato et al. | 701/532 |
| 6,842,694 | B2 * | 1/2005 | Irie | 701/428 |
| 7,483,785 | B2 * | 1/2009 | Suzuki et al. | 701/437 |
| 7,499,801 | B2 * | 3/2009 | Sakashita et al. | 701/437 |
| 8,296,001 | B1 * | 10/2012 | Kabel et al. | 701/21 |
| 2002/0053984 | A1 * | 5/2002 | Yamashita et al. | 340/988 |
| 2005/0114020 | A1 * | 5/2005 | Seto et al. | 701/211 |
| 2007/0021912 | A1 * | 1/2007 | Morita et al. | 701/211 |
| 2009/0222203 | A1 * | 9/2009 | Mueller | 701/211 |
| 2010/0017117 | A1 * | 1/2010 | Irie et al. | 701/208 |
| 2011/0313609 | A1 * | 12/2011 | Endo et al. | 701/23 |
| 2012/0029799 | A1 * | 2/2012 | Miller | 701/117 |
| 2012/0140077 | A1 * | 6/2012 | Muto et al. | 348/148 |
| 2012/0176500 | A1 * | 7/2012 | Muto et al. | 348/148 |
| 2012/0290200 | A1 * | 11/2012 | Kabel et al. | 701/409 |

FOREIGN PATENT DOCUMENTS

| | | | |
|---|---|---|---|
| JP | 2001-74490 A | | 3/2001 |
| JP | 2003-167806 | * | 6/2003 |
| JP | 2004-317390 A | | 11/2004 |
| JP | 2007-077193 | * | 3/2007 |
| JP | PCT/JP2008/063766 | * | 2/2010 |
| JP | PCT/JP2009/054311 | * | 8/2011 |

OTHER PUBLICATIONS

Fusing image features and navigation system data for augmenting guiding information displays; Stefan Vacek; Stephan Bergmann; Ulrich Mohr; Rudiger Dillmann; Multisensor Fusion and Integration for Intelligent Systems, 2006 IEEE International Conference on; Digital Object Identifier: 10.1109/MFI.2006.265648; Pub. Year: 2006 , pp. 323-328.*

Field-Based Validation of a Tactile Navigation Device; Elliott, L.R.; Van Erp, J.B.F.; Redden, E.S.; Duistermaat, M. Haptics, IEEE Transactions on; vol. 3 , Issue: 2; Digital Object Identifier: 10.1109/TOH.2010.3; Publication Year: 2010 , pp. 78-87.*

TrueSight a Pedestrian Navigation System Based in Automatic Landmark Detection and Extraction on Android Smartphone; Ferreira, A.L.S.; Rodrigues dos Santos, S.; de Miranda, L.C.; Virtual and Augmented Reality (SVR), 2012 14th Symposium on; Digital Object Identifier: 10.1109/SVR.2012.14; Publication Year: 2012 , pp. 91-99.*

KikuNavi: Real-time pedestrian navigation based on social networking service and collective intelligence; Nagasaka, H.; Okabe, M.; Onai, R.; Visual Languages and Human-Centric Computing (VL/HCC), 2012 IEEE Symposium on; Digital Object Identifier: 10.1109/VLHCC.2012.6344515; Publication Year: 2012 , pp. 193-196.*

* cited by examiner

FIG. 9
(a)
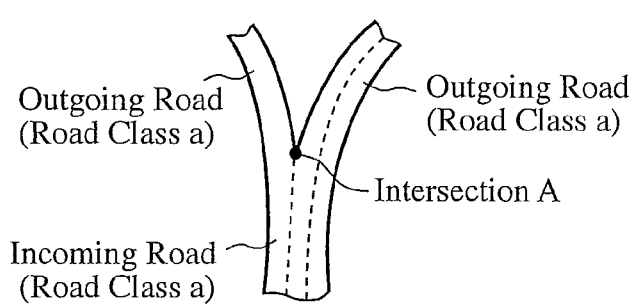
(b)
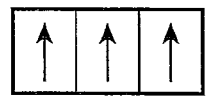
(c)
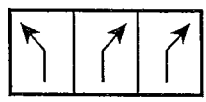
FIG. 10
(a)
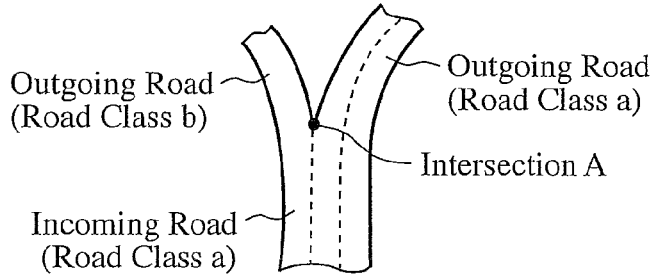
(b)
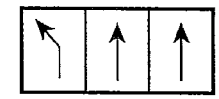
FIG. 11
(a)
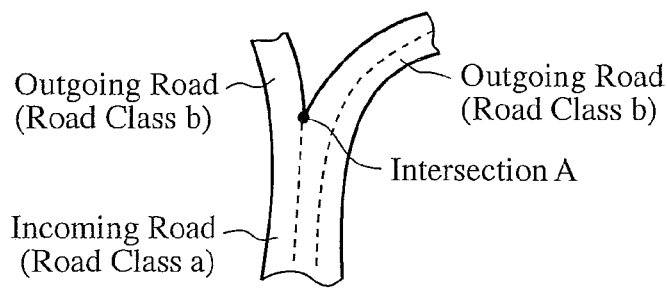
(b)
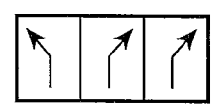

FIG. 19
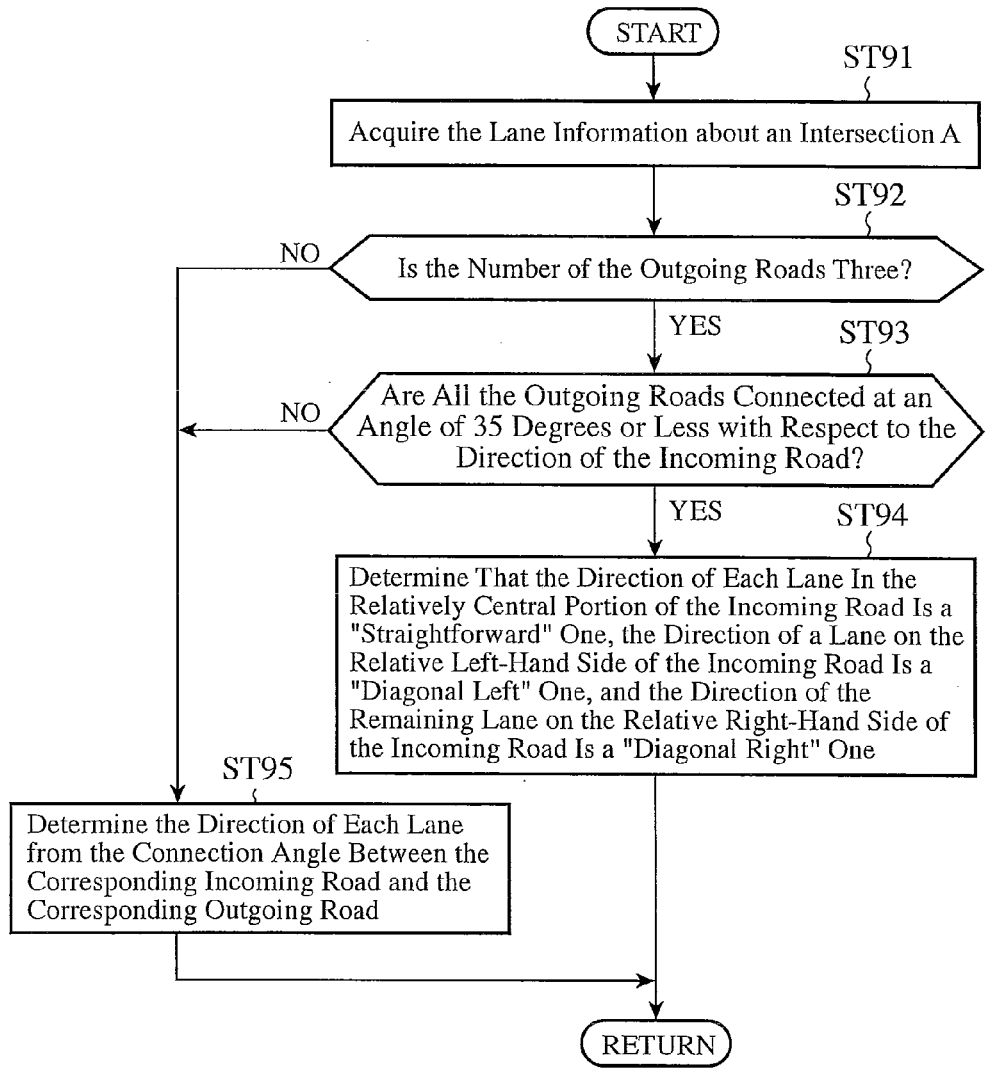
FIG. 20
(a)
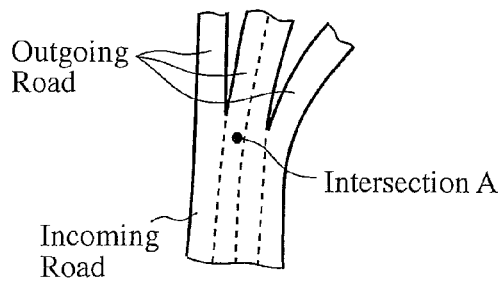
(b)    (c) 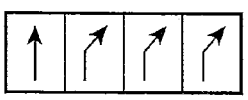

NAVIGATION SYSTEM AND LANE INFORMATION DISPLAY METHOD

FIELD OF THE INVENTION

The present invention relates to a navigation system for and a lane information display method of guiding a user to his or her destination. More particularly, it relates to a technology of displaying the direction of each lane at an intersection on a guidance screen.

BACKGROUND OF THE INVENTION

Conventionally, a navigation system that displays a lane guide map showing the direction of each lane formed on a road with an arrow is known. This conventional navigation system determines the direction of each lane which is to be displayed on such a lane guide map with an arrow on the basis of the actual geometry of roads. Therefore, for example, in a case of an intersection in which a main road curves rightwardly and a bypass branching off from the main road extends in a straightforward direction, a lane guide map in which the bypass is shown by a straightforward arrow and the main road is shown by an arrow bent toward a diagonal right direction is displayed. In this specification, the term "intersection" is used as a concept including a crosspoint where a plurality of roads intersect and a branch point where a road branch off from another road.

As a technology of displaying such a lane guide map, patent reference 1 discloses a navigation apparatus that can surely support a case in which a vehicle travels along a road having many numbers of lanes and has to make a lane change to pass through an intersection at a predetermined distance or less before reaching an intersection for guidance. This navigation apparatus includes an information storage means for storing lane information data about lanes at each intersection, a display means for displaying the lane information, and a display control means for displaying the lane information data about lanes at each intersection on the display means on the basis of the lane information data stored in the information storage means, and the display control means judges whether or not there is another intersection which the vehicle has to pass through at a predetermined distance or less before reaching an intersection for guidance, and, when there is another intersection which the vehicle has to pass through, controls to display the lane information about the other intersection which the vehicle has to pass through and the lane information about the intersection for guidance.

[Patent reference 1] JP, 2000-251197, A

A problem is however that in the lane guide map displayed by the above-mentioned conventional navigation system, a discrepancy may occur between the direction of each lane displayed on this lane guide map with an arrow and the direction of each lane which the driver recognizes. In the above-mentioned example in which for an intersection in which a main road curves rightwardly and a bypass branching off from the main road extends in a straightforward direction, a lane guide map in which the bypass is shown by a straightforward arrow and the main road is shown by an arrow bent toward a diagonal right direction is displayed, there is a case in which the driver has an illusion that the straightforward arrow shows the main road and the diagonal left arrow shows the bypass.

Furthermore, because the angle between an incoming road coming into a branch point on a highway and an outgoing road extending from the branch point is small in many cases, it is difficult to clearly determine the direction of each lane at the branch point, such as a straightforward direction, a diagonal right direction, or a diagonal left direction, from this angle. Therefore, a problem is that the directions of all lanes at an intersection for guidance may be expressed as straightforward arrows in the lane guide map displayed by the conventional navigation system.

The present invention is made in order to solve the above-mentioned problems, it is therefore an object of the present invention to provide a navigation system and a lane information display method capable of displaying a lane guide map which meets users' feeling.

DISCLOSURE OF THE INVENTION

In order to solve the above-mentioned problems, a navigation system in accordance with the present invention includes: a map data acquiring unit for acquiring map data including a road attribute added to a road; a lane information acquiring unit for acquiring both a number of lanes of a road which forms an intersection, and lane information which defines a road branching off from each of the lanes; a lane direction determining unit for determining a direction of each of the lanes on a basis of both the lane information acquired by the lane information acquiring unit, and a road attribute of an incoming road coming into the intersection and a road attribute of an outgoing road extending from the intersection, the road attributes of the incoming and outgoing roads being included in the map data acquired by the map data acquiring unit; and a lane information display unit for displaying the direction of each of the lanes determined by the lane direction determining unit with an arrow.

Because the navigation system in accordance with the present invention is constructed in such a way as to determine the direction of each of the lanes on the basis of both the lane information and the road attribute of the incoming road coming into the intersection and the road attributes of the outgoing roads extending from the intersection, the road attributes of the incoming and outgoing roads being included in the map data, and then display the direction of each of the lanes which it has determined through the lane direction determination with an arrow, it can prevent the user from having any illusion and can display a lane guide map which meets users' feeling.

BRIEF DESCRIPTION OF THE FIGURES

FIG. 9 is a view for explaining the operation of the navigation system in accordance with Embodiment 2 of the present invention in a case in which an incoming road branches into two outgoing roads having the same road class as the incoming road;

FIG. 10 is a view for explaining the operation of the navigation system in accordance with Embodiment 2 of the present invention in a case in which an incoming road branches into an outgoing road having the same road class as the incoming road and an outgoing road having a different road class;

FIG. 11 is a view for explaining the operation of the navigation system in accordance with Embodiment 2 of the present invention in a case in which an incoming road branches into two outgoing roads having a road class different from that of the incoming road;

FIG. 19 is a flow chart showing the details of a lane direction determining process which is performed in lane information display processing by a navigation system in accordance with Embodiment 5 of the present invention;

FIG. 20 is a view for explaining the operation of the navigation system in accordance with Embodiment 5 of the present invention in a case in which an incoming road branches into three outgoing roads.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
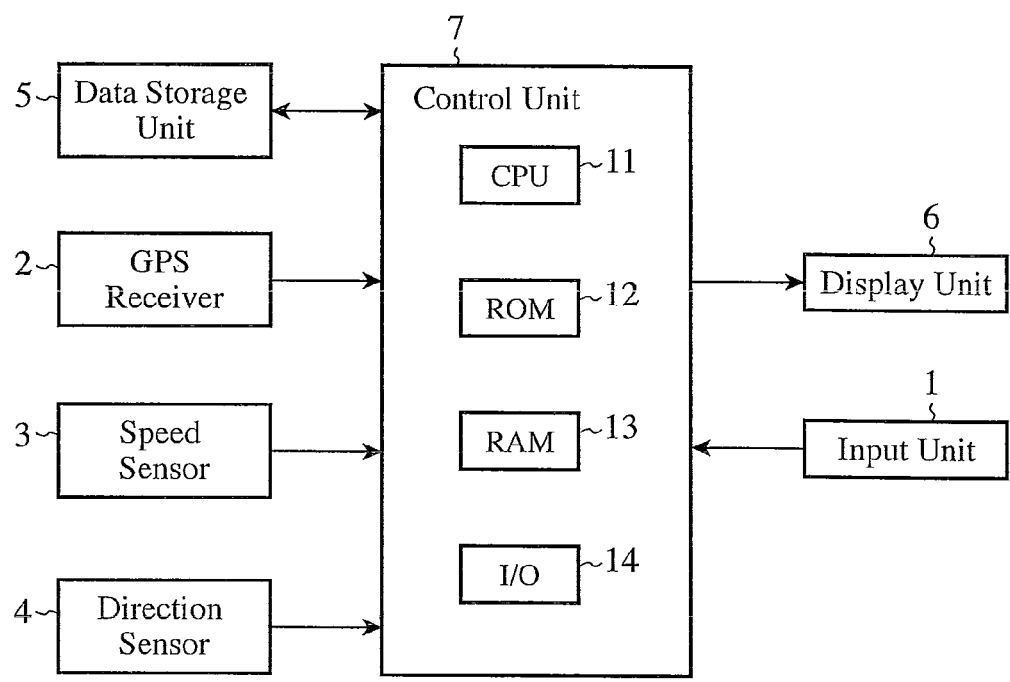
FIG. 1 is a block diagram showing the hardware configuration of a navigation system in accordance with Embodiment 1 of the present invention.

FIG. 1 is a block diagram showing the hardware configuration of a navigation system in accordance with Embodiment 1 of the present invention. This navigation system is provided with an input unit 1, a GPS (Global Positioning System) receiver 2, a speed sensor 3, a direction sensor 4, a data storage unit 5, a display unit 6, and a control unit 7.

The input unit 1 is comprised of, for example, a touch panel placed on the screen of the display unit 6. This input unit 1 is used in order for a user to, for example, set up a place of departure, a destination, or a via-place for route search, and to provide various instructions to the navigation system. Either data showing the place of departure, the destination, or the via-place inputted from this input unit 1 or a signal showing an instruction inputted from the input unit 1 is sent to the control unit 7.

The GPS receiver 2 detects the current position of a vehicle on the basis of GPS signals received from GPS satellites. The current position of the vehicle detected by this GPS receiver 2 is sent to the control unit 7 as a current position signal. The speed sensor 3 detects the traveling speed of the vehicle. The traveling speed detected by this speed sensor 3 is sent to the control unit 7 as a speed signal. The direction sensor 4 detects the angular velocity of the vehicle at the time when the vehicle is making a turn. The angular velocity detected by this direction sensor 4 is sent to the control unit 7 as an angular velocity signal.

The data storage unit 5 is comprised of, for example, an HDD (Hard Disk Drive) device, and stores various types of data for implementing navigation functions in addition to map data including lane information (which will be mentioned below in detail). Data stored in this data storage unit 5 are read by the control unit 7. The data storage unit 5 is not limited to an HDD, and a drive device that reads data from a DVD (Digital Versatile Disk) or a CD (Compact Disc) mounted thereto can be alternatively used to construct the data storage unit.

The display unit 6 is comprised of, for example, an LCD (Liquid Crystal Display) and displays various pieces of guidance information including a lane guide map on the screen thereof according to an image signal sent thereto from the control unit 7.

The control unit 7 performs a process of displaying the lane guide map, a route search process, a route guidance process, or the like, and also controls the whole of this navigation system. This control unit 7 is provided with a CPU (Central Processing Unit) 11, a ROM (Read Only Memory) 12, a RAM (Random Access Memory) 13, and an input/output controller (I/O; Input/Output controller) 14. The details of functions implemented by this control unit 7 will be mentioned below.

The CPU 11 uses the RAM 13 as a work memory and operates according to a program read from the ROM 12 to carry out various processes. The ROM 12 stores programs and data which the CPU 11 reads to carry out the various processes. The RAM 13 is used as the work memory of the CPU 11 and temporarily stores data which the CPU is using or generating in performing arithmetic processing.

The input/output controller 14 functions as an interface among the CPU 11 included in the control unit 7, the input unit 1, the GPS receiver 2, the speed sensor 3, the direction sensor 4, the data storage unit 5, and the display unit 6, and controls transmission and reception of data among these units.

Figure 2:
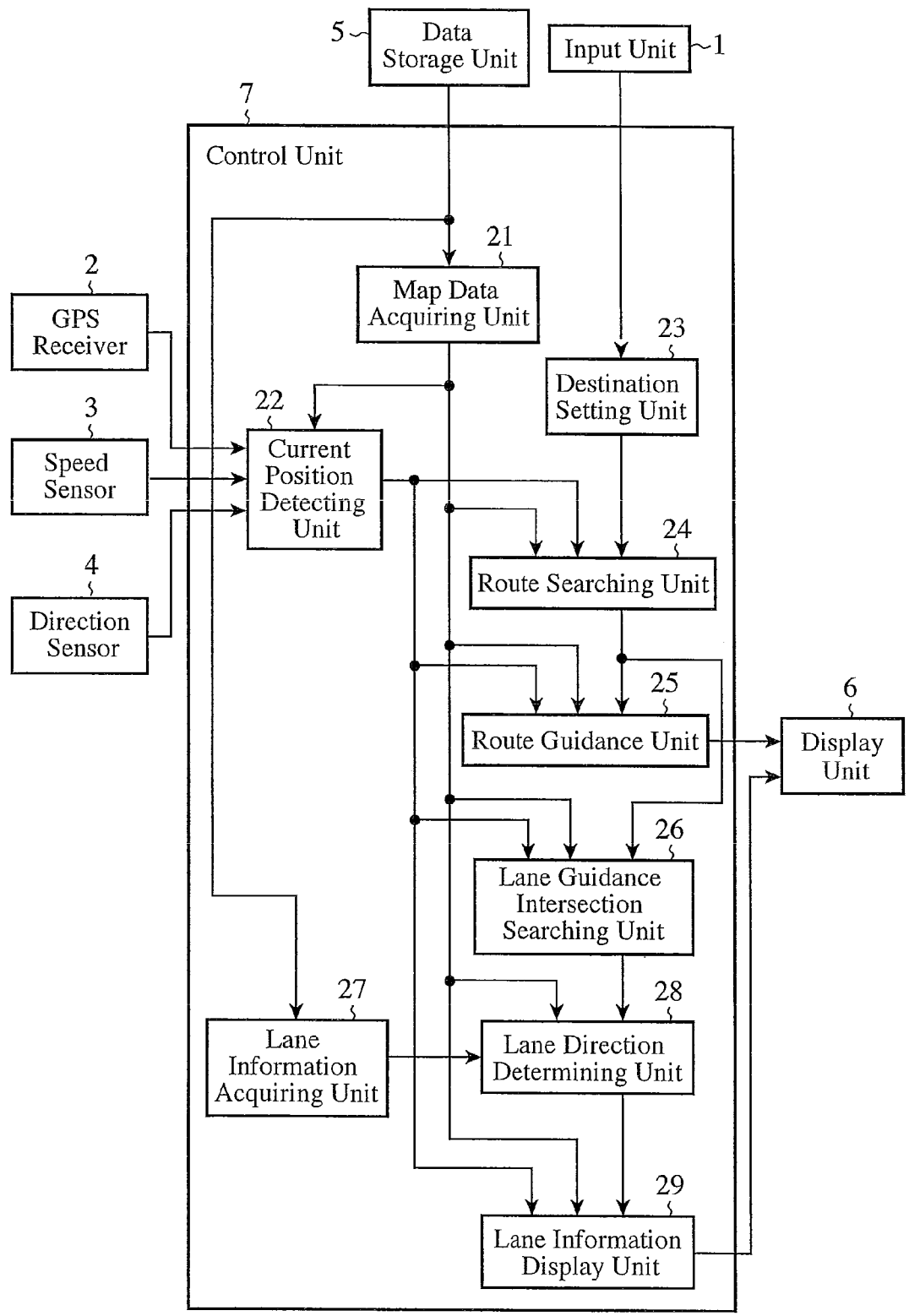
FIG. 2 is a functional block diagram showing the details of functions implemented by a control unit shown in FIG. 1.

Next, the details of the functions implemented by the control unit 7 will be explained with reference to a functional block diagram shown in FIG. 2. The control unit 7 is constructed of a program executed by the CPU 11, and includes a map data acquiring unit 21, a current position detecting unit 22, a destination setting unit 23, a route searching unit 24, a route guidance unit 25, a lane guidance intersection searching unit 26, a lane information acquiring unit 27, a lane direction determining unit 28, and a lane information display unit 29.

The map data acquiring unit 21 acquires map data from the data storage unit 5. The map data acquired by this map data acquiring unit 21 are sent to the current position detecting unit 22, the route searching unit 24, the route guidance unit 25, the lane guidance intersection searching unit 26, the lane direction determining unit 28, and the lane information display unit 29.

The current position detecting unit 22 detects the current position of the vehicle on the basis of the current position signal sent thereto from the GPS receiver 2 and/or a current position signal which is generated through autonomous navigation using the angular velocity signal sent thereto from the direction sensor 4 and the speed signal sent thereto from the speed sensor 3. The current position of the vehicle detected by this current position detecting unit 22 is sent, as current position data, to the route searching unit 24, the route guidance unit 25, the lane guidance intersection searching unit 26, and the lane information display unit 29.

The destination setting unit 23 sends data showing the destination sent thereto from the input unit 1 to the route searching unit 24 as destination data, and also sends an instruction for starting a route search to the route searching unit 24. According to the instruction for starting a route search sent from the destination setting unit 23, the route searching unit 24 searches for a route from the current position shown by the current position data sent thereto from the current position detecting unit 22 to the destination shown by the destination data sent thereto from the destination setting unit 23 on the basis of the map data acquired by the map data acquiring unit 21. The route which is searched for by this route searching unit 24 is sent, as route data, to the route guidance unit 25 and the lane guidance intersection searching unit 26.

When judging that the current position shown by the current position data sent thereto from the current position detecting unit 22 reaches a guidance point on the route shown by the route data sent thereto from the route searching unit 24, the route guidance unit 25 generates guidance information on the basis of the map data sent thereto from the map data acquiring unit 21, and sends the guidance information to the display unit 6 as an image signal. As a result, the guidance information is displayed on the screen of the display unit 6.

The lane guidance intersection searching unit 26 searches for an intersection having lane information added thereto and existing forwardly on the route shown by the route data sent thereto from the route searching unit 24, i.e., an intersection which is a target for lane guidance on the basis of the map data sent thereto from the map data acquiring unit 21 and the current position data sent thereto from the current position detecting unit 22. The intersection searched for by this lane guidance intersection searching unit 26 is sent, as intersection data, to the lane direction determining unit 28.

The lane information acquiring unit 27 acquires the lane information from the data storage unit 5. In this case, the lane information includes the number of lanes of each road which forms the intersection and information for defining a road branching off from each lane. The lane information acquired by this lane information acquiring unit 27 is sent to the lane direction determining unit 28.

The lane direction determining unit 28 determines the direction of each lane of each road which forms the intersection shown by the intersection data sent thereto from the lane guidance intersection searching unit 26 on the basis of the lane information acquired by the lane information acquiring unit 27 and the map data sent thereto from the map data acquiring unit 21. The determination result by this lane direction determining unit 28 is sent to the lane information display unit 29.

The lane information display unit 29 checks to see whether or not the distance between the current position of the vehicle shown by the current position data sent thereto from the current position detecting unit 22 and the intersection which is the target for lane guidance is equal to or shorter than a predetermined distance on the basis of the map data sent thereto from the map data acquiring unit 21, and, when judging that the distance between the current position and the intersection is equal to or shorter than the predetermined distance, generates a lane guide map showing the direction of each lane with an arrow on the basis of the determination result sent thereto from the lane direction determining unit 28. Data showing the lane guide map generated by this lane information display unit 29 are sent, as an image signal, to the display unit 6. As a result, the lane guide map is displayed on the screen of the display unit 6.

Next, the operation of the navigation system in accordance with Embodiment 1 of the present invention constructed as mentioned above will be explained with reference to a flow chart shown in FIG. 3 by focusing on a lane information display process of displaying lane information to present it for guidance.

In the lane information display process, a destination is set up first (step ST11). More specifically, when a user instructs the navigation system to start a route search after inputting his or her destination using the input unit 1, the destination setting unit 23 sends the destination data sent thereto from the input unit 1 to the route searching unit 24, and also sends the instruction for starting a route search to the route searching unit 24.

The navigation system then performs a route search and a route guidance (step ST12). More specifically, in response to the instruction for starting a route search which is sent thereto from the destination setting unit 23, the route searching unit 24 searches for an optimal route from the current position shown by the current position data sent thereto from the current position detecting unit 22 to the destination shown by the destination data sent thereto from the destination setting unit 23 on the basis of the map data acquired by the map data acquiring unit 21, and sends, as route data, the optimal route to the route guidance unit 25.

In response to this route data, when judging that the current position shown by the current position data sent thereto from the current position detecting unit 22 reaches a guidance point on the route shown by the route data sent thereto from the route searching unit 24, the route guidance unit 25 generates guidance information on the basis of the map data sent thereto from the map data acquiring unit 21, and sends the guidance information, as an image signal, to the display unit 6. As a result, the guidance information is displayed on the screen of the display unit 6, and a general route guidance (a route guidance without any update of the lane guide map) is performed.

The navigation system then checks to see whether there exists an intersection A which is a target for lane guidance forwardly (step ST13). More specifically, the lane guidance intersection searching unit 26 searches for an intersection which is a target for lane guidance and which exists on the route shown by the route data sent thereto from the route searching unit 24 on the basis of the map data sent thereto from the map data acquiring unit 21, and compares this searched-for intersection with the current position shown by the current position data sent thereto from the current position detecting unit 22 so as to check to see whether there exist an intersection A which is a target for lane guidance forwardly on the route.

When, in this step ST13, judging that there exists no intersection A which is a target for lane guidance forwardly on the route, the navigation system continues the general route guidance while carrying out this step ST13 repeatedly. When judging that there exists an intersection A which is a target for lane guidance forwardly on the route while carrying out this step ST13 repeatedly, the navigation system then performs a lane direction determining process of determining the direction of each lane at the intersection A (step ST14). More specifically, the lane direction determining unit 28 determines the direction of each lane of each road which forms the intersection A shown by the intersection data sent thereto from the lane guidance intersection searching unit 26 on the basis of the lane information acquired by the lane information acquiring unit 27 and the map data sent thereto from the map data acquiring unit 21. The details of this lane direction determining process will be mentioned below. The determination result by this lane direction determining unit 28 is sent to the lane information display unit 29.

The navigation system then checks to see whether or not the distance between the vehicle and the intersection A is equal to or shorter than a predetermined distance (step ST15). More specifically, the lane information display unit 29 checks to see whether or not the distance between the current position of the vehicle shown by the current position data sent thereto from the current position detecting unit 22 and the intersection A which is a target for lane guidance is equal to or shorter than the predetermined distance on the basis of the map data sent thereto from the map data acquiring unit 21. When, in this step ST15, judging that the distance between the vehicle and the intersection A is not equal to or shorter than the predetermined distance, the navigation system continues the general route guidance while carrying out this step ST15 repeatedly.

In contrast, when, in step ST15, judging that the distance between the vehicle and the intersection A is equal to or shorter than the predetermined distance, the navigation system displays the lane information (step ST16). More specifically, the lane information display unit 29 generates a lane guide map showing the direction of each lane with an arrow on the basis of the determination result sent from the lane direction determining unit 28, and sends, as an image signal, data showing this lane guide map to the display unit 6. As a result, the lane guide map is displayed on the screen of the display unit 6. After that, the navigation system ends the lane information display process.

Next, the details of the lane direction determining process performed in step ST14 of the flow chart shown in above-mentioned FIG. 3 will be explained with reference to a flow chart shown in FIG. 4. Hereafter, a case in which the navigation system carries out the process of determining the direction of each lane according to road types will be explained by limiting to branching of a highway in which it is difficult to determine the direction of each lane at an intersection only from the connection angle between the corresponding incoming road and the corresponding outgoing road at the intersection, and also limiting to a two-branch intersection which is a general branch point.

In this lane direction determining process, the navigation system acquires the lane information about the intersection A first (step ST21). More specifically, the lane direction determining unit 28 acquires the lane information about the intersection A which is a target for lane guidance from the lane information acquiring unit 27. The lane direction determining unit then acquires the road types of the incoming road and the outgoing roads connected to the intersection A (step ST22). More specifically, the lane direction determining unit 28 acquires the road types of the incoming road and the outgoing roads connected to the intersection A from the map data sent thereto from the map data acquiring unit 21.

The lane direction determining unit then checks to see whether or not the road type of the incoming road is a highway type or a ramp type (step ST23). More specifically, the lane direction determining unit 28 checks to see whether the road type of the incoming road acquired in step ST22 shows a highway or a ramp. When, in this step ST23, judging that the road type of the incoming road is neither a highway type nor a ramp type, the lane direction determining unit advances the sequence to step ST31.

The lane direction determining unit, in step ST31, determines the direction of each lane from the connection angle between the corresponding incoming road and the corresponding outgoing road. More specifically, the lane direction determining unit 28 determines the geometry of the roads on the basis of the map data acquired from the map data acquiring unit 21 and determines the direction of each lane on the basis of this road geometry, like a conventional navigation system. After that, the navigation system returns from this lane direction determining process and then advances to the process of step ST15 of the flow chart shown in FIG. 3.

When, in above-mentioned step ST23, judging that the road type of the incoming road is a highway type or a ramp type, the lane direction determining unit then checks to see whether or not the number of the outgoing roads is two (step ST24). More specifically, the lane direction determining unit 28 checks to see whether or not the number of the outgoing roads from the intersection A is "2" by referring to the lane information acquired in step ST21. When, in this step ST24, judging that the number of the outgoing roads is not two, the lane direction determining unit advances the sequence to step ST31.

When, in above-mentioned step ST24, judging that the number of the outgoing roads is two, the lane direction determining unit then checks to see whether or not the road types of all the outgoing roads are a highway type (step ST25). More specifically, the lane direction determining unit 28 checks to see whether the road types of all the outgoing roads acquired in step ST22 show a highway. When, in this step ST25, judging that the road types of all the outgoing roads are a highway type, the lane direction determining unit determines that the directions of all the lanes are a straight direction (step ST26).

Figure 5:
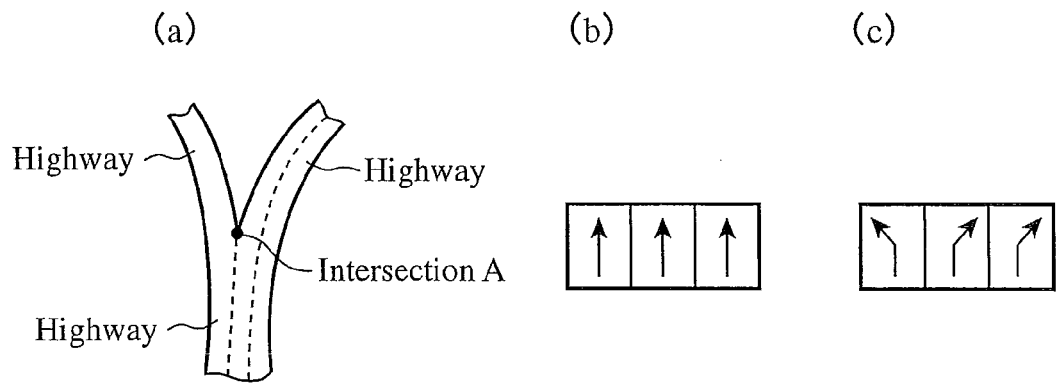
FIG. 5 is a view for explaining the operation of the navigation system in accordance with Embodiment 1 of the present invention in a case in which a highway branches into two highways.

For example, when a highway branches into two highways at an intersection A, as shown in FIG. 5(*a*), the navigation system shows the directions of all the lanes with arrows each showing a straight direction, as shown in FIG. 5(*b*). In contrast, a conventional navigation system that determines the direction of each lane on the basis of the road geometry shows the direction of one lane on the left-hand side of the highway with an arrow bent toward a diagonal left direction and the direction of the remaining two lanes on the right-hand side of the highway with arrows bent toward a diagonal right direction according to the road geometry, as shown in FIG. 5(c). After that, the navigation system of this embodiment returns from this lane direction determining process and then advances to the process of step ST15 of the flow chart shown in FIG. 3.

When, in above-mentioned step ST25, judging that the road types of all the outgoing roads are not a highway type, the navigation system checks to see whether or not the road types of all the outgoing roads are a ramp type (step ST27). More specifically, the lane direction determining unit 28 checks to see whether the road types of all the outgoing roads acquired in step ST22 show a ramp. When, in this step ST27, judging that the road types of all the outgoing roads are a ramp type, the lane direction determining unit determines that the direction of a lane on the relative left-hand side lane is a "diagonal left" one, and the direction of a lane on the relative right-hand side is a "diagonal right" one (step ST28).

Figure 6:
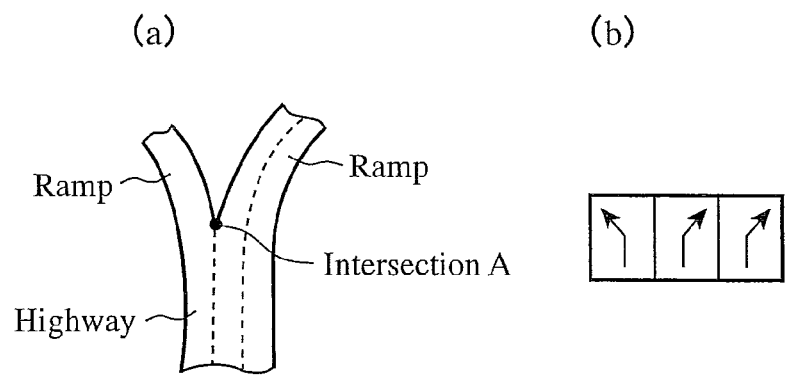
FIG. 6 is a view for explaining the operation of the navigation system in accordance with Embodiment 1 of the present invention in a case in which a highway branches into two ramps.

For example, in a case in which a highway branches into two ramps at an intersection A, as shown in FIG. 6(a), the navigation system shows the direction of one lane on the relative left-hand side of the highway (one lane on the left-hand side) with a "diagonal left" arrow and shows the directions of lanes on the relative right-hand side of the highway (two lanes on the right-hand side) with a "diagonal right" arrow, as shown in FIG. 6(b). A conventional navigation system that determines the direction of each lane on the basis of the road geometry similarly produces a display as shown in FIG. 6(b). After that, the navigation system of this embodiment returns from this lane direction determining process and then advances to the process of step ST15 of the flow chart shown in FIG. 3.

When, in above-mentioned step ST27, judging that the road types of all the outgoing roads are not a ramp type, the navigation system then checks to see whether there exists only one outgoing road whose road type is a highway type (step ST29). More specifically, the lane direction determining unit 28 checks to see whether there exists only one outgoing road whose road type is a highway type on the basis of the road types of the outgoing roads acquired in step ST22. When, in this step ST29, judging that not only one outgoing road whose road type is a highway type exists, the lane direction determining unit advances the sequence to step ST31.

Figure 7:
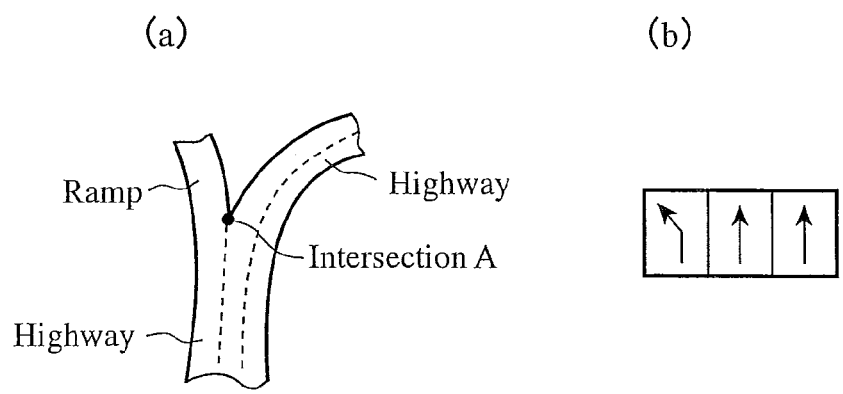
FIG. 7 is a view for explaining the operation of the navigation system in accordance with Embodiment 1 of the present invention in a case in which a highway branches into a highway and a ramp.

In contrast, when, in above-mentioned step ST29, judging that there exists only one outgoing road whose road type is a highway type, the lane direction determining unit determines that the direction of the lane corresponding to the outgoing road of the highway type is a "straightforward" one, and also determines the directions of the remaining lanes from their positions relative to the position of the lane corresponding to the outgoing road (step ST30). For example, in a case in which a highway branches into a ramp and a highway at an intersection A, as shown in FIG. 7(a), the navigation system shows the direction of each of lanes corresponding to the highway with a "straightforward" arrow, and also shows the direction of a lane corresponding to the ramp with a "diagonal left" arrow, as shown in FIG. 7(b).

In a case in which a ramp is connected to a lane on the rightmost side of the incoming road, the navigation system shows the direction of each lane corresponding to the highway with a "straightforward" arrow, and also shows the direction of a lane corresponding to the ramp with a "diagonal right" arrow, though not shown. A conventional navigation system that determines the direction of each lane on the basis of the road geometry produces a display as shown in FIG. 5(c). After that, the navigation system of this embodiment returns from this lane direction determining process and then advances to the process of step ST15 of the flow chart shown in FIG. 3.

As previously explained, in a case of, for example, an intersection where a highway having three lanes branches into a ramp connected to one lane on the left-hand side thereof and a highway connected to the remaining two lanes on the right-hand side thereof, the navigation system in accordance with Embodiment 1 of the present invention shows the direction of each of the two lanes extending to the highway with a straightforward arrow and also shows the direction of the single lane extending to the ramp with a diagonal left arrow. Therefore, the navigation system in accordance with Embodiment 1 of the present invention can determine the direction of each lane according to the road type of the road connected to each lane without being influenced by the road geometry.

Figure 3:
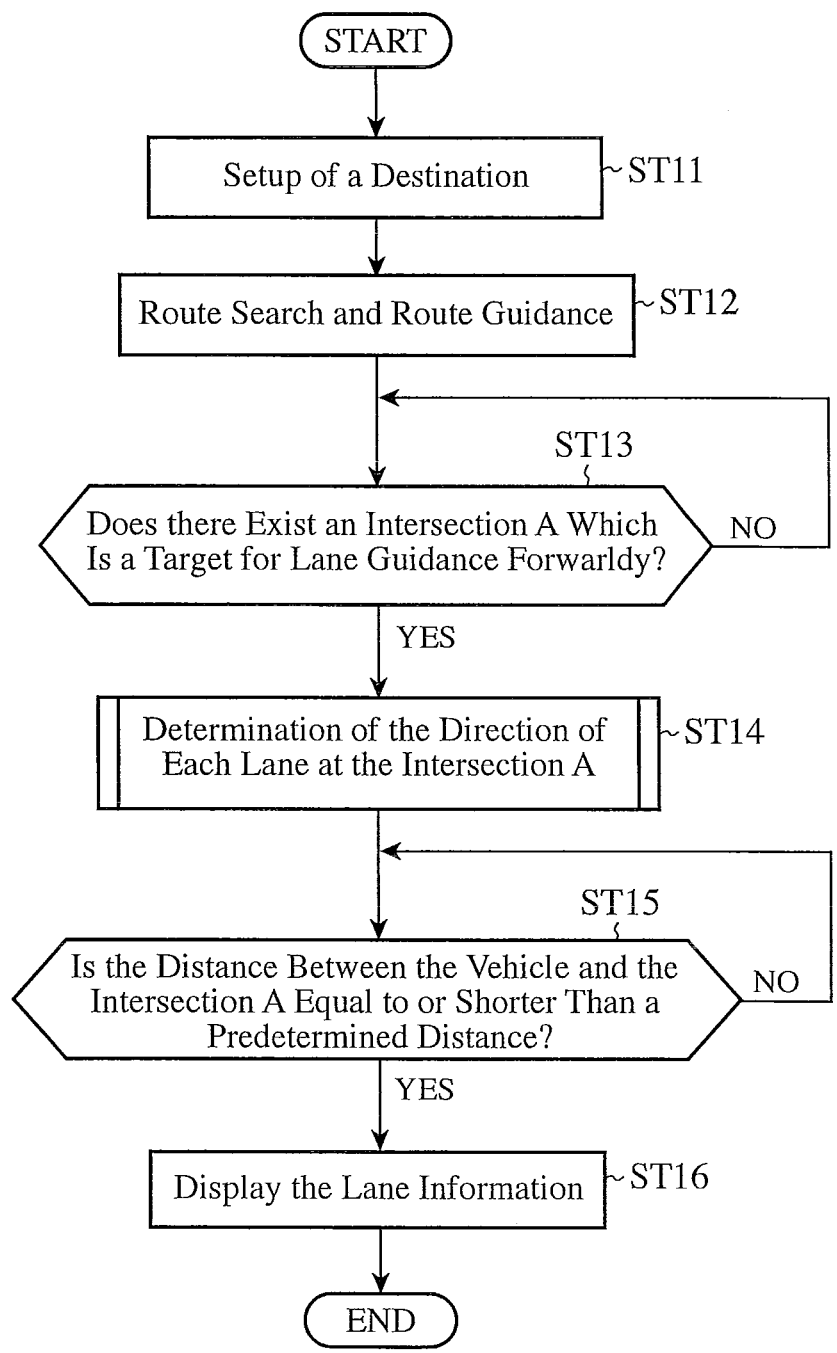
FIG. 3 is a flow chart showing the operation of the navigation system in accordance with Embodiment 1 of the present invention by focusing on lane information display processing.
Figure 4:
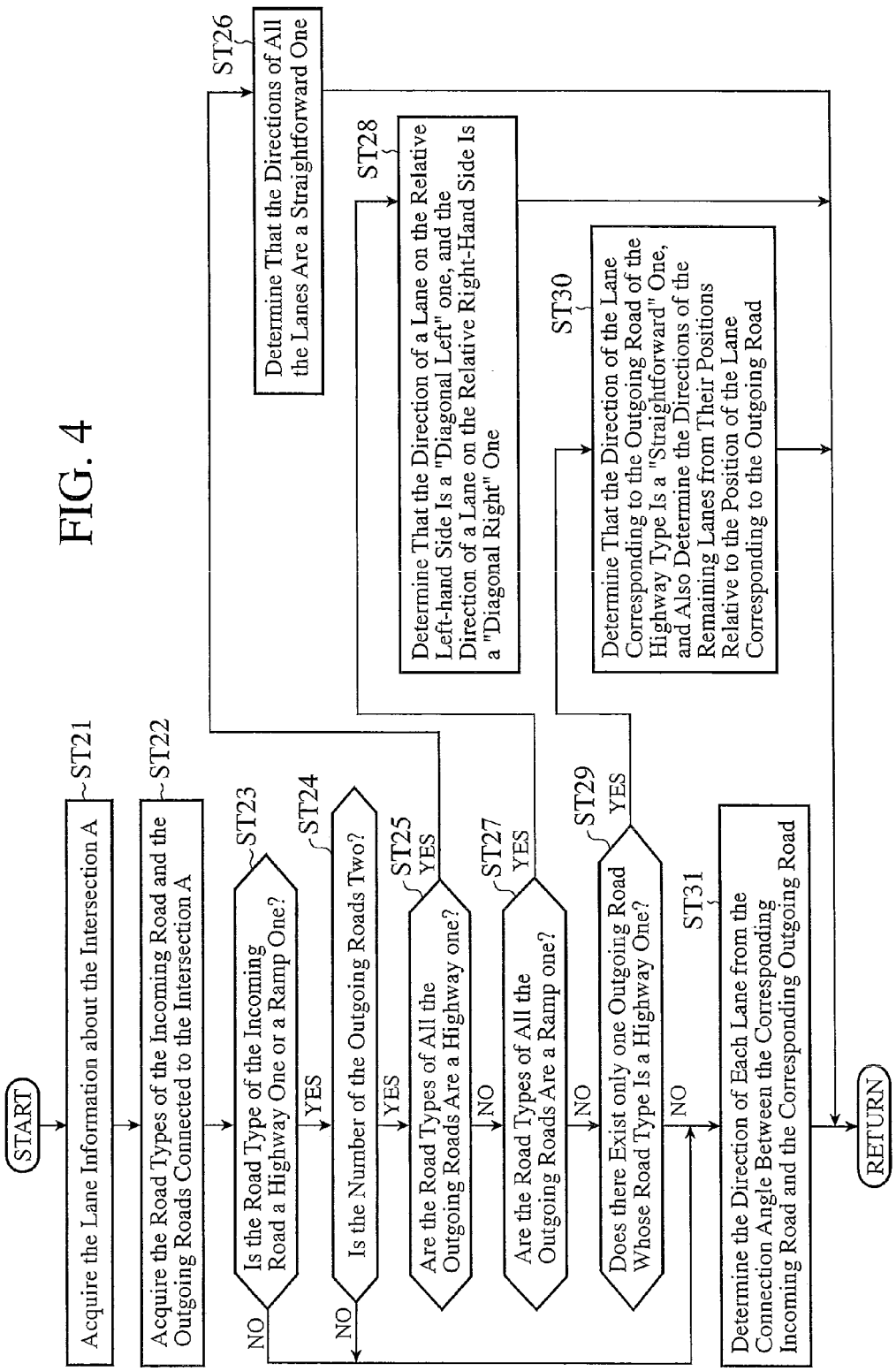
FIG. 4 is a flow chart showing the details of a lane direction determining process which is performed in the lane information display processing by the navigation system in accordance with Embodiment 1 of the present invention.

In the lane information display process shown in the flow chart of FIG. 3, the example in which there exists an intersection which is a target for lane guidance forwardly on the route acquired through the route search is explained, though the navigation system in accordance with Embodiment 1 of the present invention can be constructed in such a way as to perform the above-mentioned direction determining process of determining the direction of each lane even when no route search is performed, but there exists an intersection which is a target for lane guidance forwardly.

Embodiment 2

A navigation system in accordance with Embodiment 2 of the present invention is constructed in such a way as to determine the direction of each lane from the road class of each road which forms an intersection. Because the structure of the navigation system in accordance with this Embodiment 2 is the same as that of the navigation system in accordance with above-mentioned Embodiment 1, the explanation of the structure will be omitted hereafter.

Next, the operation of the navigation system in accordance with Embodiment 2 of the present invention will be explained. Because the operation of this navigation system differs from that of the navigation system in accordance with Embodiment 1 in only the direction determining process of determining the direction of each lane performed in step ST14 of the lane information display process shown in the flow chart of FIG. 3, only a different portion will be explained hereafter.

Figure 8:
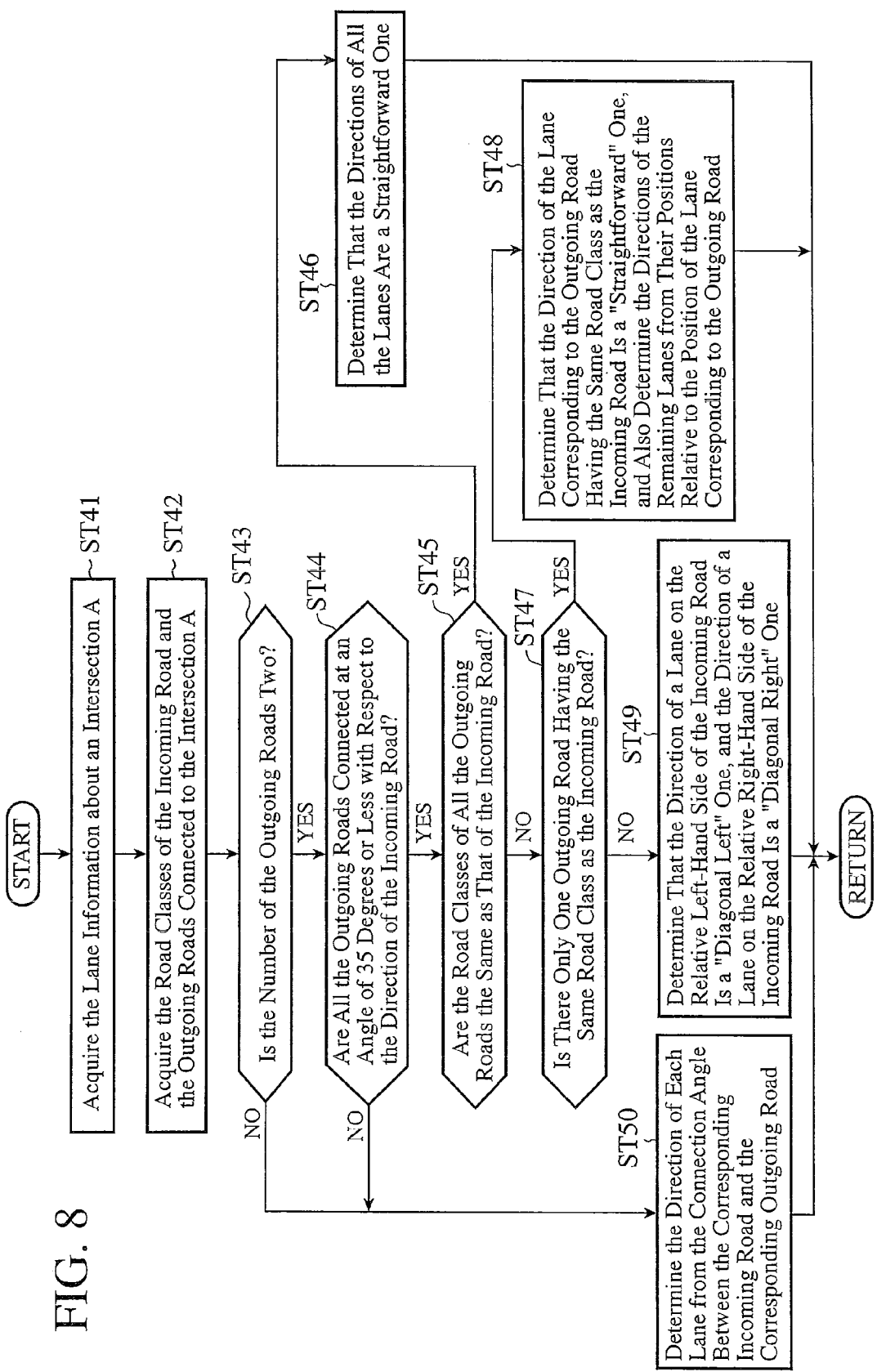
FIG. 8 is a flow chart showing the details of a lane direction determining process which is performed in lane information display processing by a navigation system in accordance with Embodiment 2 of the present invention.

FIG. 8 is a flowchart showing the details of the direction determining process of determining the direction of each lane performed in step ST14 of the flow chart shown in FIG. 3. Hereafter, a case in which the navigation system carries out the process of determining the direction of each lane according to the road class will be explained by limiting to a two-branch and narrow-angle-branch intersection where it is difficult to determine the direction of each lane only from the connection angle between the corresponding incoming road and the corresponding outgoing road at the intersection.

In this lane direction determining process, the navigation system acquires the lane information about an intersection A first (step ST41). More specifically, a lane direction determining unit 28 acquires the lane information about the intersection A which is a target for lane guidance from a lane information acquiring unit 27. The lane direction determining unit then acquires the road classes of the incoming road and the outgoing roads connected to the intersection A (step ST42).

More specifically, the lane direction determining unit 28 acquires the road classes of the incoming road and the outgoing roads connected to the intersection A from map data sent thereto from a map data acquiring unit 21.

The navigation system then checks to see whether or not the number of the outgoing roads is two (step ST43). More specifically, the lane direction determining unit 28 checks to see whether or not the number of the outgoing roads from the intersection A is "2" by referring to the lane information acquired in step ST41. When, in this step ST43, judging that the number of the outgoing roads is not two, the lane direction determining unit advances the sequence to step ST50.

The lane direction determining unit, in step ST50, determines the direction of each lane from the connection angle between the corresponding incoming road and the corresponding outgoing road. More specifically, the lane direction determining unit 28 determines the geometry of the roads on the basis of the map data acquired from the map data acquiring unit 21 and determines the direction of each lane on the basis of this road geometry, like a conventional navigation system. After that, the navigation system of this embodiment returns from this lane direction determining process and then advances to the process of step ST15 of the flow chart shown in FIG. 3.

When, in above-mentioned step ST43, judging that the number of the outgoing roads is two, the navigation system then checks to see whether all the outgoing roads are connected at an angle of 35 degrees or less with respect to the direction of the incoming road (step ST44). More specifically, the lane direction determining unit 28 determines the road geometry on the basis of the map data acquired from the map data acquiring unit 21, and checks to see whether all the outgoing roads have an angle of 35 degrees or less with respect to the direction of the incoming road on the basis of this road geometry. When, in this step ST44, judging that not all the outgoing roads are connected at an angle of 35 degrees or less with respect to the direction of the incoming road, the navigation system advances the sequence to step ST50.

When, in above-mentioned step ST44, judging that all the outgoing roads are connected at an angle of 35 degrees or less with respect to the direction of the incoming road, the navigation system then checks to see whether or not the road classes of all the outgoing roads are the same as that of the incoming road (step ST45). More specifically, the lane direction determining unit 28 checks to see whether or not the road classes of all the outgoing roads acquired in step ST42 are the same as that of the incoming road. When, in this step ST45, judging that the road classes of all the outgoing roads are the same as that of the incoming road, the navigation system determines that the directions of all the lanes are a straightforward one (step ST46).

For example, in a case in which an incoming road having a road class a branches into two outgoing roads having the road class a at an intersection A, as shown in FIG. 9(*a*), the navigation system shows the direction of each of all the lanes with a "straightforward" arrow, as shown in FIG. 9(*b*). In contrast, a conventional navigation system that determines the direction of each lane on the basis of the road geometry shows the direction of one lane on the left-hand side of the incoming road with an arrow bent toward a diagonal left direction and the direction of the remaining two lanes on the right-hand side of the incoming road with arrows bent toward a diagonal right direction according to the road geometry, as shown in FIG. 9(*c*). After that, the navigation system of this embodiment returns from this lane direction determining process and then advances to the process of step ST15 of the flow chart shown in FIG. 3.

When, in above-mentioned step ST45, judging that the road classes of all the outgoing roads are not the same as that of the incoming road, the navigation system then checks to see whether there exists only one outgoing road having the same road class as the incoming road (step ST47). More specifically, the lane direction determining unit 28 checks to see whether there exists only one outgoing road having the same road class as the incoming road on the basis of the road classes of the outgoing roads acquired in step ST42. When, in this step ST47, judging that there exists only one outgoing road having the same road class as the incoming road, the lane direction determining unit determines that the direction of the lane corresponding to the outgoing road having the same road class as the incoming road is a "straightforward" one, and also determines the directions of the remaining lanes from their positions relative to the position of the lane corresponding to the outgoing road (step ST48).

For example, in a case in which an incoming road having a road class a branches into an outgoing road having the road class a and an outgoing road having a road class b (a>b) at an intersection A, as shown in FIG. 10(*a*), the navigation system shows the direction of each of lanes corresponding to the outgoing road having the road class a with a "straightforward" arrow, and also shows the direction of a lane corresponding to the outgoing road having the road class b with a "diagonal left" arrow, as shown in FIG. 10(*b*). In a case in which an outgoing road having the road class b is connected to a lane on the rightmost side of the incoming road, the navigation system shows the direction of a lane corresponding to an outgoing road having the road class a with a "straightforward" arrow, and also shows the direction of a lane corresponding to the outgoing road having the road class b with a "diagonal right" arrow, though not shown. A conventional navigation system that determines the direction of each lane on the basis of the road geometry produces a display as shown in FIG. 9(*c*). After that, the navigation system of this embodiment returns from this lane direction determining process and then advances to the process of step ST15 of the flow chart shown in FIG. 3.

When, in above-mentioned step ST47, judging that not only one outgoing road having the same road class as the incoming road exists, the lane direction determining unit determines that the direction of a lane on the relative left-hand side of the incoming road is a "diagonal left" one, and the direction of a lane on the relative right-hand side of the incoming road is a "diagonal right" one (step ST49). For example, in a case in which an incoming road having the road class a branches into two outgoing roads having the road class b at an intersection A, as shown in FIG. 11(*a*), the navigation system shows the direction of one lane on the relative left-hand side of the incoming road (one lane on the left-hand side) with a "diagonal left" arrow and shows the directions of the remaining lanes on the relative right-hand side of the incoming road (two lanes on the right-hand side) with a "diagonal right" arrow, as shown in FIG. 11(*b*). A conventional navigation system that determines the direction of each lane on the basis of the road geometry similarly produces a display as shown in FIG. 11(*b*). After that, the navigation system of this embodiment returns from this lane direction determining process and then advances to the process of step ST15 of the flow chart shown in FIG. 3.

As previously explained, in a case of, for example, an intersection where a high-road-class road having three lanes branches into a high-road-class road connected to two lanes on the right-hand side thereof and a low-road-class road connected to the remaining lane on the left-hand side lane thereof, the navigation system in accordance with Embodiment 2 of the present invention shows the direction of each of the two lanes extending to the high-road-class road with a straightforward arrow and also shows the direction of the single lane extending to the low-road-class road with a diagonal left arrow. Therefore, the navigation system in accordance with Embodiment 2 of the present invention can determine the direction of each lane according to the road class of the road connected to each lane without being influenced by the road geometry.

Embodiment 3

A navigation system in accordance with Embodiment 3 of the present invention is constructed in such a way as to determine the direction of each lane from a road name or a road number (simply referred to as a "road name" from here on) of each road which forms an intersection. Because the structure of the navigation system in accordance with this Embodiment 3 is the same as that of the navigation system in accordance with above-mentioned Embodiment 1, the explanation of the structure will be omitted hereafter.

Next, the operation of the navigation system in accordance with Embodiment 3 of the present invention will be explained. Because the operation of this navigation system differs from that of the navigation system in accordance with Embodiment 1 in only the direction determining process of determining the direction of each lane performed in step ST14 of the lane information display process shown in the flow chart of FIG. 3, only a different portion will be explained hereafter.

Figure 12:
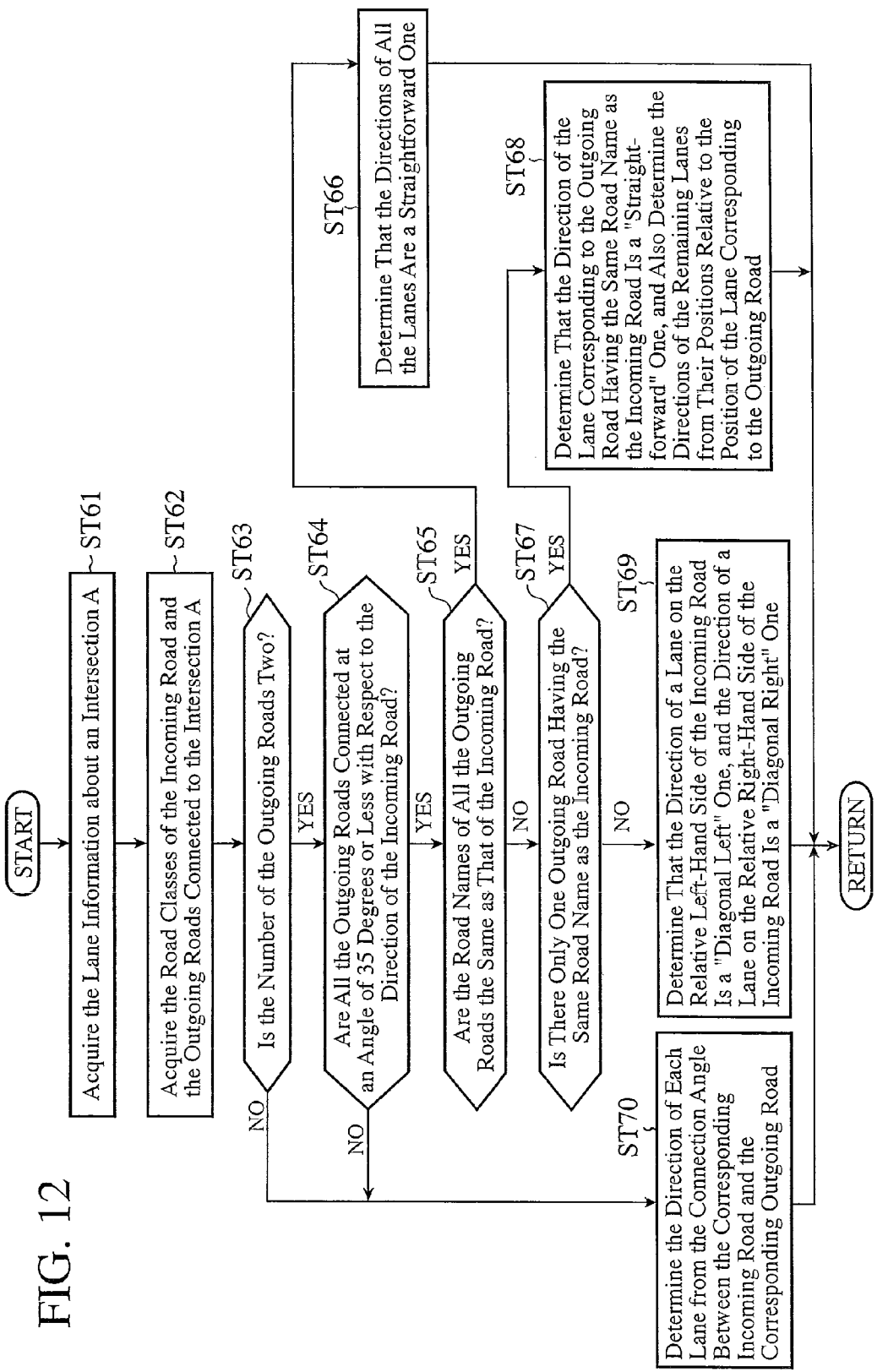
FIG. 12 is a flow chart showing the details of a lane direction determining process which is performed in lane information display processing by a navigation system in accordance with Embodiment 3 of the present invention.

FIG. 12 is a flow chart showing the details of the direction determining process of determining the direction of each lane performed in step ST14 of the flow chart shown in FIG. 3. Hereafter, a case in which the navigation system carries out the process of determining the direction of each lane according to road names will be explained by limiting to a two-branch and narrow-angle-branch intersection where it is difficult to determine the direction of each lane only from the connection angle between the corresponding incoming road and the corresponding outgoing road at the intersection.

In this lane direction determining process, the navigation system acquires the lane information about an intersection A first (step ST61). More specifically, a lane direction determining unit 28 acquires the lane information about the intersection A which is a target for lane guidance from a lane information acquiring unit 27. The lane direction determining unit then acquires the road names of the incoming road and the outgoing roads connected to the intersection A (step ST62). More specifically, the lane direction determining unit 28 acquires the road names of the incoming road and the outgoing roads connected to the intersection A from map data sent thereto from a map data acquiring unit 21.

The navigation system then checks to see whether or not the number of the outgoing roads is two (step ST63). More specifically, the lane direction determining unit 28 checks to see whether or not the number of the outgoing roads from the intersection A is "2" by referring to the lane information acquired in step ST61. When, in this step ST63, judging that the number of the outgoing roads is not two, the lane direction determining unit advances the sequence to step ST70.

The lane direction determining unit, in step ST70, determines the direction of each lane from the connection angle between the corresponding incoming road and the corresponding outgoing road. More specifically, the lane direction determining unit 28 determines the geometry of the roads on the basis of the map data acquired from the map data acquiring unit 21 and determines the direction of each lane on the basis of this road geometry, like a conventional navigation system. After that, the navigation system of this embodiment returns from this lane direction determining process and then advances to the process of step ST15 of the flow chart shown in FIG. 3.

When, in above-mentioned step ST63, judging that the number of the outgoing roads is two, the navigation system then checks to see whether all the outgoing roads are connected at an angle of 35 degrees or less with respect to the direction of the incoming road (step ST64). More specifically, the lane direction determining unit 28 determines the road geometry on the basis of the map data acquired from the map data acquiring unit 21, and checks to see whether all the outgoing roads have an angle of 35 degrees or less with respect to the direction of the incoming road on the basis of this road geometry. When, in this step ST64, judging that not all the outgoing roads are connected at an angle of 35 degrees or less with respect to the direction of the incoming road, the navigation system advances the sequence to step ST70.

When, in above-mentioned step ST64, judging that all the outgoing roads are connected at an angle of 35 degrees or less with respect to the direction of the incoming road, the navigation system then checks to see whether the road names of all the outgoing roads are the same as that of the incoming road (step ST65). More specifically, the lane direction determining unit 28 checks to see whether or not the road names of all the outgoing roads acquired in step ST42 are the same as that of the incoming road. When, in this step ST65, judging that the road names of all the outgoing roads are the same as that of the incoming road, the lane direction determining unit determines that the directions of all the lanes are a straightforward one (step ST66).

Figure 13:
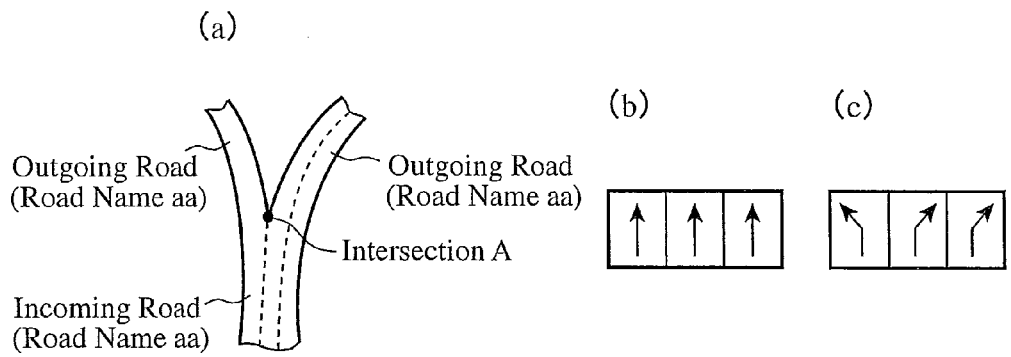
FIG. 13 is a view for explaining the operation of the navigation system in accordance with Embodiment 3 of the present invention in a case in which an incoming road branches into two outgoing roads having the same road name as the incoming road.

For example, in a case in which an incoming road having a road name aa branches into two outgoing roads having the road name aa at an intersection A, as shown in FIG. 13(*a*), the navigation system shows the direction of each of all the lanes with a straightforward arrow, as shown in FIG. 13(*b*). In contrast, a conventional navigation system that determines the direction of each lane on the basis of the road geometry shows the direction of one lane on the left-hand side of the incoming road with an arrow bent toward a diagonal left direction and the direction of the remaining two lanes on the right-hand side of the incoming road with arrows bent toward a diagonal right direction according to the road geometry, as shown in FIG. 13(*c*). After that, the navigation system of this embodiment returns from this lane direction determining process and then advances to the process of step ST15 of the flow chart shown in FIG. 3.

When, in above-mentioned step ST65, judging that the road names of all the outgoing roads are not the same as that of the incoming road, the lane direction determining unit then checks to see whether there exists only one outgoing road having the same road name as the incoming road (step ST67). More specifically, the lane direction determining unit 28 checks to see whether there exists only one outgoing road having the same road name as the incoming road on the basis of the road names of the outgoing roads acquired in step ST62. When, in this step ST67, judging that there exists only one outgoing road having the same road name as the incoming road, the lane direction determining unit determines that the direction of a lane corresponding to the outgoing road having the same road name as the incoming road is a "straightforward" one, and also determines the directions of the remaining lanes from their positions relative to the position of the lane corresponding to the outgoing road (step ST68).

Figure 14:
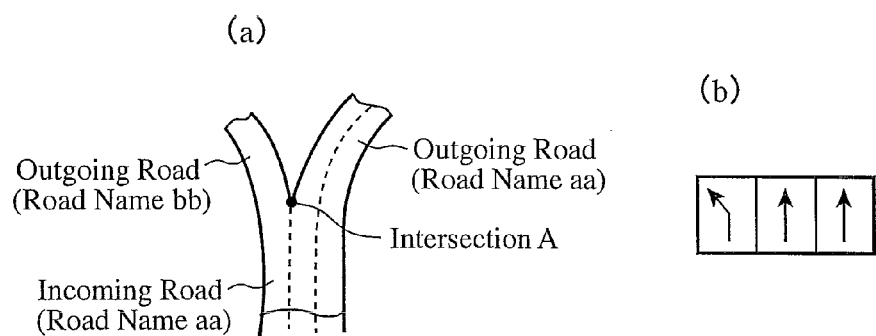
FIG. 14 is a view for explaining the operation of the navigation system in accordance with Embodiment 3 of the present invention in a case in which an incoming road branches into an outgoing road having the same road name as the incoming road and an outgoing road having a different road name.

For example, in a case in which an incoming road having a road name aa branches into an outgoing road having the road name aa and an outgoing road having a road name bb at an intersection A, as shown in FIG. 14(*a*), the navigation system shows the direction of each of lanes corresponding to the outgoing road having the road name aa with a "straightforward" arrow, and also shows the direction of the remaining lane corresponding to the outgoing road having the road class bb with a "diagonal left" arrow, as shown in FIG. 14(*b*). In a case in which an outgoing road having the road name bb is connected to a lane on the rightmost side of the incoming road, the navigation system shows the direction of a lane corresponding to an outgoing road having the road name aa with a "straightforward" arrow, and also shows the direction of a lane corresponding to the outgoing road having the road class bb with a "diagonal right" arrow, though not shown. A conventional navigation system that determines the direction of each lane on the basis of the road geometry produces a display as shown in FIG. 3(*c*). After that, the navigation system of this embodiment returns from this lane direction determining process and then advances to the process of step ST15 of the flow chart shown in FIG. 3.

Figure 15:
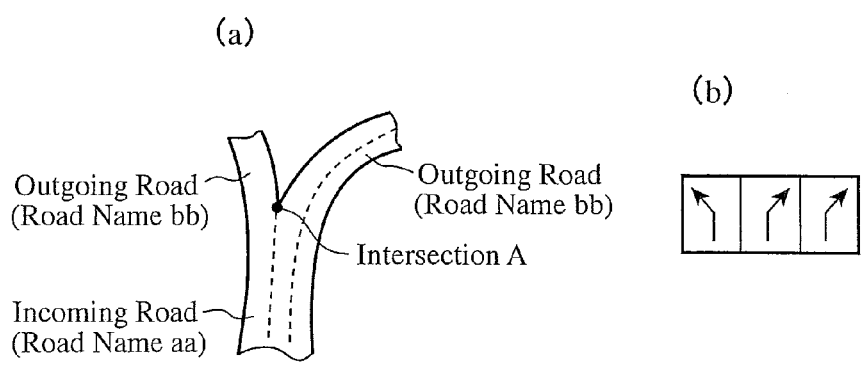
FIG. 15 is a view for explaining the operation of the navigation system in accordance with Embodiment 2 of the present invention in a case in which an incoming road branches into two outgoing roads having a road name different from that of the incoming road.

When, in above-mentioned step ST67, judging that not only one outgoing road having the same road name as the incoming road exists, the lane direction determining unit determines that the direction of a lane on the relative left-hand side of the incoming road is a "diagonal left" one, and the direction of a lane on the relative right-hand side of the incoming road is a "diagonal right" one (step ST69). For example, in a case in which an incoming road having a road name aa branches into two outgoing roads having a road name bb at an intersection A, as shown in FIG. 15(*a*), the navigation system shows the direction of one lane on the relative left-hand side of the incoming road (one lane on the left-hand side) with a "diagonal left" arrow and shows the directions of the remaining lanes on the relative right-hand side of the incoming road (two lanes on the right-hand side) with a "diagonal right" arrow, as shown in FIG. 15(*b*). A conventional navigation system that determines the direction of each lane on the basis of the road geometry similarly produces a display as shown in FIG. 15(*b*). After that, the navigation system of this embodiment returns from this lane direction determining process and then advances to the process of step ST15 of the flow chart shown in FIG. 3.

As previously explained, in a case of, for example, an intersection where a road having a road name aa and having three lanes branches into a road having the road name aa and connected to two lanes on the right-hand side thereof and a road having a road name bb and connected to the remaining lane on the left-hand side lane thereof, the navigation system in accordance with Embodiment 3 of the present invention shows the direction of each of the two lanes extending to the road having the road name aa with a straightforward arrow and also shows the direction of the single lane extending to the road having the road name bb with a diagonal left arrow. Therefore, the navigation system in accordance with Embodiment 3 of the present invention can determine the direction of each lane according to the road name or road number of the road connected to each lane without being influenced by the road geometry.

Embodiment 4

A navigation system in accordance with Embodiment 4 of the present invention is constructed in such a way as to determine the direction of each lane from the number of lanes of each outgoing road included in roads which form an intersection. Because the structure of the navigation system in accordance with this Embodiment 4 is the same as that of the navigation system in accordance with above-mentioned Embodiment 1, the explanation of the structure will be omitted hereafter.

Next, the operation of the navigation system in accordance with Embodiment 4 of the present invention will be explained. Because the operation of this navigation system differs from that of the navigation system in accordance with Embodiment 1 in only the direction determining process of determining the direction of each lane performed in step ST14 of the lane information display process shown in the flow chart of FIG. 3, only a different portion will be explained hereafter.

Figure 16:
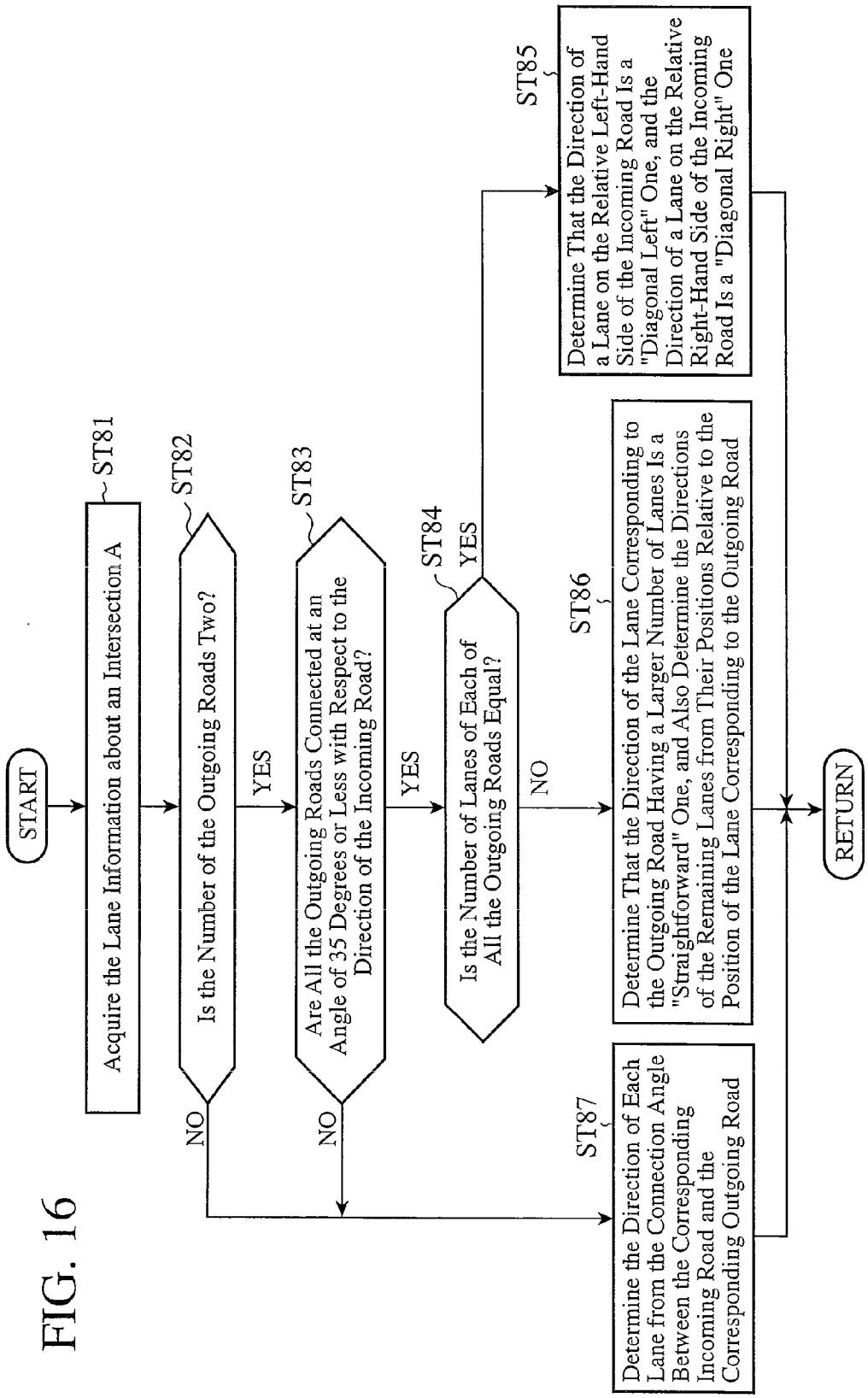
FIG. 16 is a flow chart showing the details of a lane direction determining process which is performed in lane information display processing by a navigation system in accordance with Embodiment 4 of the present invention.

FIG. 16 is a flow chart showing the details of the direction determining process of determining the direction of each lane performed in step ST14 of the flow chart shown in FIG. 3. Hereafter, a case in which the navigation system carries out the process of determining the direction of each lane according to the number of lanes of each outgoing road will be explained by limiting to a two-branch and narrow-angle-branch intersection where it is difficult to determine the direction of each lane only from the connection angle between the corresponding incoming road and the corresponding outgoing road at the intersection.

In this lane direction determining process, the navigation system acquires the lane information about an intersection A first (step ST81). More specifically, a lane direction determining unit 28 acquires the lane information about the intersection A which is a target for lane guidance from a lane information acquiring unit 27. The navigation system then checks to see whether or not the number of the outgoing roads is two (step ST82). More specifically, the lane direction determining unit 28 checks to see whether or not the number of the outgoing roads from the intersection A is "2" by referring to the lane information acquired in step ST81. When, in this step ST82, judging that the number of the outgoing roads is not two, the lane direction determining unit advances the sequence to step ST87.

The lane direction determining unit, in step ST87, determines the direction of each lane from the connection angle between the corresponding incoming road and the corresponding outgoing road. More specifically, the lane direction determining unit 28 determines the geometry of the roads on the basis of map data acquired from a map data acquiring unit 21 and determines the direction of each lane on the basis of this road geometry, like a conventional navigation system. After that, the navigation system of this embodiment returns from this lane direction determining process and then advances to the process of step ST15 of the flow chart shown in FIG. 3.

When, in above-mentioned step ST82, judging that the number of the outgoing roads is two, the navigation system then checks to see whether all the outgoing roads are connected at an angle of 35 degrees or less with respect to the direction of the incoming road (step ST83). More specifically, the lane direction determining unit 28 determines the road geometry on the basis of the map data acquired from the map data acquiring unit 21, and checks to see whether all the outgoing roads have an angle of 35 degrees or less with respect to the direction of the incoming road on the basis of this road geometry. When, in this step ST83, judging that not all the outgoing roads are connected at an angle of 35 degrees or less with respect to the direction of the incoming road, the navigation system advances the sequence to step ST87.

When, in above-mentioned step ST83, judging that all the outgoing roads are connected at an angle of 35 degrees or less with respect to the direction of the incoming road, the navigation system then checks to see whether the number of lanes of each of all the outgoing roads is equal (step ST84). More specifically, the lane direction determining unit 28 checks to see whether the lane number of each of all the outgoing roads shown by the lane information acquired in step ST81 is equal. When, in this step ST84, judging that the number of lanes of each of all the outgoing roads is equal, the lane direction determining unit determines that the direction of a lane on the relative left-hand side of the incoming road is a "diagonal left" one, and the direction of a lane on the relative right-hand side of the incoming road is a "diagonal right" one (step ST85).

Figure 17:
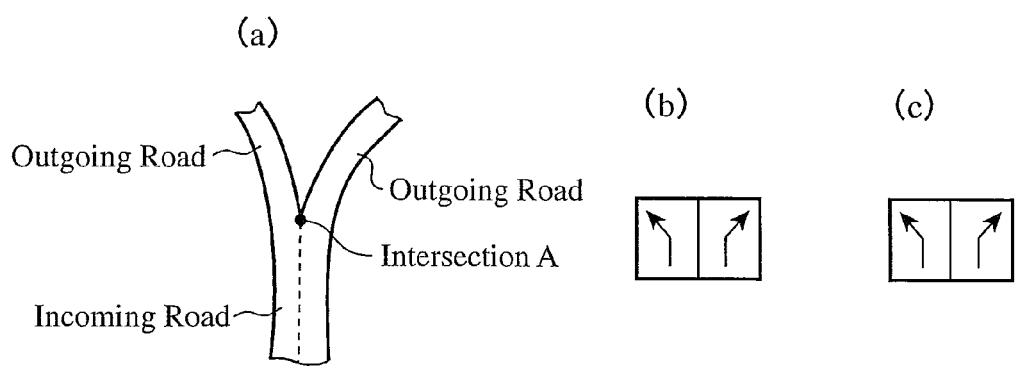
FIG. 17 is a view for explaining the operation of the navigation system in accordance with Embodiment 4 of the present invention in a case in which an incoming road branches into two outgoing roads having an equal number of lanes.

For example, in a case in which an incoming road branches into two outgoing roads each having a single lane at an intersection A, as shown in FIG. 17(*a*), the navigation system shows the direction of one lane on the relative left-hand side of the incoming road with a "diagonal left" arrow and shows the direction of the other lane on the relative right-hand side of the incoming road with a "diagonal right" arrow, as shown in FIG. 17(*b*). In contrast, a conventional navigation system that determines the direction of each lane on the basis of the road geometry shows the direction of one lane on the left-hand side of the incoming road with an arrow bent toward a diagonal left direction and the direction of the other lane on the right-hand side of the incoming road with an arrow bent toward a diagonal right direction according to the road geometry, as shown in FIG. 17(*c*), as in the case shown in FIG. 17(*b*). After that, the navigation system of this embodiment returns from this lane direction determining process and then advances to the process of step ST15 of the flow chart shown in FIG. 3.

Figure 18:
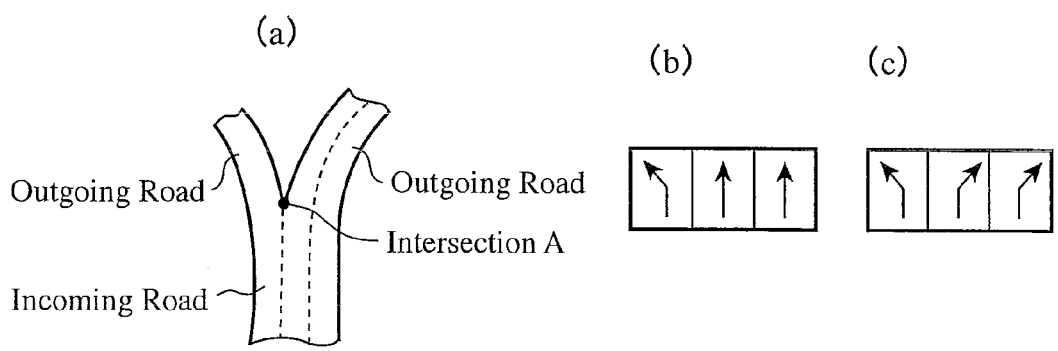
FIG. 18 is a view for explaining the operation of the navigation system in accordance with Embodiment 4 of the present invention in a case in which an incoming road branches into two outgoing roads having different numbers of lanes.

When, in above-mentioned step ST84, judging that the number of lanes of each of the outgoing roads is not equal, the lane direction determining unit determines that the direction of lanes corresponding to the incoming road having a relatively larger number of lanes is a "straightforward" one, and also determines the direction of each remaining lane from its positions relative to the positions of the lanes corresponding the incoming road (step ST86). For example, in a case in which an incoming road branches into an outgoing road having two lanes and an outgoing road having a single lane at an intersection A, as shown in FIG. 18(*a*), the navigation system shows the direction of each of the lanes of the outgoing road having the two lanes with an straightforward arrow and shows the direction of the lane of the outgoing road having the single lane with a diagonal left arrow, as shown in FIG. 18(*b*).

In a case in which an outgoing road having a single lane is connected to a lane on the rightmost side of the incoming road, the navigation system shows the direction of each lane of another outgoing road having two lanes with a "straightforward" arrow, and also shows the direction of the lane of the outgoing road having the single lane with a "diagonal right" arrow, though not shown. A conventional navigation system that determines the direction of each lane on the basis of the road geometry produces a display as shown in FIG. 18(*c*). After that, the navigation system of this embodiment returns from this lane direction determining process and then advances to the process of step ST15 of the flow chart shown in FIG. 3.

As previously explained, in a case of, for example, an intersection where an incoming road having three lanes branches into two roads extending in different directions, one of the two roads being connected to two lanes on the right-hand side of the incoming road and the other one of them being connected to the remaining lane on the left-hand side lane of the incoming road, the navigation system in accordance with Embodiment 4 of the present invention shows the direction of each of the two lanes whose number is relatively large with a straightforward arrow and also shows the direction of the single lane whose number is relatively small with a diagonal left arrow. Therefore, the navigation system in accordance with Embodiment 4 of the present invention can determine the direction of each lane according to the number of lanes of the road connected to each lane without being influenced by the road geometry.

Embodiment 5

A navigation system in accordance with Embodiment 5 of the present invention is constructed in such a way as to determine the direction of each lane from a connection relation among outgoing roads extending from an intersection. Because the structure of the navigation system in accordance with this Embodiment 5 is the same as that of the navigation system in accordance with above-mentioned Embodiment 1, the explanation of the structure will be omitted hereafter.

Next, the operation of the navigation system in accordance with Embodiment 5 of the present invention will be explained. Because the operation of this navigation system differs from that of the navigation system in accordance with Embodiment 1 in only the direction determining process of determining the direction of each lane performed in step ST14 of the lane information display process shown in the flow chart of FIG. 3, only a different portion will be explained hereafter.

FIG. 19 is a flow chart showing the details of the direction determining process of determining the direction of each lane performed in step ST14 of the flow chart shown in FIG. 3. Hereafter, a case in which the navigation system carries out the process of determining the direction of each lane will be explained by limiting to a three-branch and narrow-angle-branch intersection where it is difficult to determine the direction of each lane only from the connection angle between the corresponding incoming road and the corresponding outgoing road at the intersection.

In this lane direction determining process, the navigation system acquires the lane information about an intersection A first (step ST91). More specifically, a lane direction determining unit 28 acquires the lane information about the intersection A which is a target for lane guidance from a lane information acquiring unit 27. The navigation system then checks to see whether or not the number of the outgoing roads is three (step ST92). More specifically, the lane direction determining unit 28 checks to see whether or not the number of the outgoing roads from the intersection A is "3" by referring to the lane information acquired in step ST91. When, in this step ST92, judging that the number of the outgoing roads is not three, the lane direction determining unit advances the sequence to step ST95.

When, in above-mentioned step ST92, judging that the number of the outgoing roads is three, the navigation system then checks to see whether all the outgoing roads are connected at an angle of 35 degrees or less with respect to the direction of the incoming road (step ST93). More specifically, the lane direction determining unit 28 determines the road geometry on the basis of map data acquired from a map data acquiring unit 21, and checks to see whether all the outgoing roads have an angle of 35 degrees or less with respect to the direction of the incoming road on the basis of this road geometry. When, in this step ST93, judging that not all the outgoing roads are connected at an angle of 35 degrees or less with respect to the direction of the incoming road, the navigation system advances the sequence to step ST95.

The lane direction determining unit, in step ST95, determines the direction of each lane from the connection angle between the corresponding incoming road and the corresponding outgoing road. More specifically, the lane direction determining unit 28 determines the geometry of the roads on the basis of the map data acquired from the map data acquiring unit 21 and determines the direction of each lane on the basis of this road geometry, like a conventional navigation system. After that, the navigation system of this embodiment returns from this lane direction determining process and then advances to the process of step ST15 of the flow chart shown in FIG. 3.

When, in above-mentioned step ST93, judging that all the outgoing roads are connected at an angle of 35 degrees or less with respect to the direction of the incoming road, the lane direction determining unit then determines that the direction of each lane in the relatively central portion of the incoming road is a "straightforward" one, the direction of a lane on the relative left-hand side of the incoming road is a "diagonal left" one, and the direction of the remaining lane on the relative right-hand side of the incoming road is a "diagonal right" one (step ST94). For example, in a case in which an incoming road branches into three outgoing roads at an intersection A, as shown in FIG. 20(*a*), the navigation system shows the direction of one lane on the relative left-hand side of the incoming road with a "diagonal left" arrow, shows the direction of each lane in the relative central portion of the incoming road with a "straightforward" arrow, and shows the direction of the remaining lane on the relative right-hand side of the incoming road with a "diagonal right" arrow, as shown in FIG. 20(*b*). In contrast, a conventional navigation system that determines the direction of each lane on the basis of the road geometry shows the direction of one lane on the left-hand side of the incoming road with an arrow bent toward a diagonal left direction and the direction of two lanes in the central portion of the incoming road and one lane on the right-hand side of the incoming road with arrows bent toward a diagonal right direction, as shown in FIG. 20(*c*). After that, the navigation system of this embodiment returns from this lane direction determining process and then advances to the process of step ST15 of the flow chart shown in FIG. 3.

As previously explained, in a case of, for example, an intersection where an incoming road having three lanes branches into a road connected to one lane on the left-hand side thereof, a road connected to two lanes in the central portion thereof, and a road connected to the remaining lane on the right-hand side lane thereof, the navigation system in accordance with Embodiment 5 of the present invention shows the direction of each of the two lanes at the central portion of the incoming road with a straightforward arrow, shows the direction of the single lane extending leftwardly with a diagonal left arrow, and also shows the direction of the single lane extending rightwardly with a diagonal right arrow. Therefore, the navigation system in accordance with Embodiment 5 of the present invention can determine the direction of each lane according to the connection relation among the roads without being influenced by the road geometry.

INDUSTRIAL APPLICABILITY

As mentioned above, the navigation system and the lane information display method in accordance with the present invention determine the direction of each lane on the basis of the road attributes of the incoming road and the outgoing roads at an intersection to display a lane guide map which meets users' feeling without being influenced by the road geometry of the intersection. Therefore, the navigation system and the lane information display method in accordance with the present invention are suitable for use in a car navigation apparatus that can display the direction of each lane at an intersection on a guidance screen, and so on.

The invention claimed is:

1. A navigation system comprising:
a display device that displays a lane guidance map representing direction of lanes of a road; and
a processing device that controls the display device to display the lane guidance map, the processing device including:
a map data acquiring unit configured to acquire map data;
a lane direction determining unit configured to
select one of determination processes to determine direction of arrows to be displayed on the lane guidance map, wherein the selection is made in accordance with a road type of an incoming road coming into an intersection defined by the map data acquired by the map data acquiring unit and a number of outgoing roads extending from the intersection, wherein the direction of the arrows represent direction of lanes in the outgoing roads, and wherein the determination processes include a determination process using connection angles between the incoming road and the outgoing roads and another determination process using both road types and the number of the outgoing roads, and
determine the direction of the arrow to be displayed in the lane guidance map in accordance with the selected determination process; and
a lane information display unit configured to display the arrows representing the direction of the lanes of the outgoing roads on the lane guidance map in accordance with a result of the determination of the lane direction determining unit.

2. A navigation system comprising:
a display device that displays a lane guidance map representing direction of lanes of a road; and
a processing device that controls the display device to display the lane guidance map, the processing device including:
a map data acquiring unit configured to acquire map data;
a lane direction determining unit configured to
select one of determination processes to determine direction of arrows to be displayed on the lane guidance map, wherein the selection is made in accordance with a number of outgoing roads extending from an intersection defined by the map data acquired by the map data acquiring unit and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using road classes of the incoming road and the outgoing roads, and
determine the direction of the arrow to be displayed in the lane guidance map in accordance with the selected determination process; and
a lane information display unit configured to display the arrows representing the direction of the lanes of the outgoing roads on the lane guidance map in accordance with a result of the determination of the lane direction determining unit.

3. A navigation system comprising:
a display device that displays a lane guidance map representing direction of lanes of a road; and
a processing device that controls the display device to display the lane guidance map, the processing device including:
   a map data acquiring unit configured to acquire map data;
   a lane direction determining unit configured to
      select one of determination processes to determine direction of arrows to be displayed on the lane guidance map, wherein the selection is made in accordance with a number of outgoing roads extending from an intersection defined by the map data acquired by the map data acquiring unit and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using road names or numerical identifier of the incoming road and the outgoing roads, and
      determine the direction of the arrow to be displayed in the lane guidance map in accordance with the selected determination process; and
   a lane information display unit configured to display the arrows representing the direction of the lanes of the outgoing roads on the lane guidance map in accordance with a result of the determination of the lane direction determining unit.

4. A navigation system comprising:
a display device that displays a lane guidance map representing direction of lanes of a road; and
a processing device that controls the display device to display the lane guidance map, the processing device including:
   a map data acquiring unit configured to acquire map data;
   a lane direction determining unit configured to
      select one of determination processes to determine direction of arrows to be displayed on the lane guidance map, wherein the selection is made in accordance with a number of outgoing roads extending from an intersection defined by the map data acquired by the map data acquiring unit and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using the number of the outgoing roads, and
      determine the direction of the arrow to be displayed in the lane guidance map in accordance with the selected determination process; and
   a lane information display unit configured to display the arrows representing the direction of the lanes of the outgoing roads on the lane guidance map in accordance with a result of the determination of the lane direction determining unit.

5. A navigation system comprising:
a display device that displays a lane guidance map representing direction of lanes of a road; and
a processing device that controls the display device to display the lane guidance map, the processing device including:
   a map data acquiring unit configured to acquire map data;
   a lane direction determining unit configured to
      select one of determination processes to determine direction of arrows to be displayed on the lane guidance map, wherein the selection is made in accordance with a number of outgoing roads extending from an intersection defined by the map data acquired by the map data acquiring unit and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using connection relations among the outgoing roads, and
      determine the direction of the arrow to be displayed in the lane guidance map in accordance with the selected determination process; and
   a lane information display unit configured to display the arrows representing the direction of the lanes of the outgoing roads on the lane guidance map in accordance with a result of the determination of the lane direction determining unit.

6. A lane information display method of displaying arrows on a lane guidance map by a display device of a navigation system, the arrows representing direction of lanes in outgoing roads which extend from an intersection, the method comprising steps of:
   acquiring map data;
   selecting one of determination processes to determine direction of arrows to be displayed on the lane guidance map, wherein the selection is made in accordance with a road type of an incoming road coming into an intersection defined by the acquired map data and a number of outgoing roads extending from the intersection, wherein the direction of the arrows represent direction of lanes in the outgoing roads, and wherein the determination processes include a determination process using connection angles between the incoming road and the outgoing roads and another determination process using both road types and the number of the outgoing roads;
   determine the direction of the arrow to be displayed in the lane guidance map in accordance with the selected determination process; and
   displaying the arrows representing the direction of the lanes of the outgoing roads on the lane guidance map in accordance with a result of the determination.

7. A lane information display method of displaying arrows on a lane guidance map by a display device of a navigation system, the arrows representing direction of lanes in outgoing roads which extend from an intersection, the method comprising steps of:
   acquiring map data;
   selecting one of determination processes to determine direction of arrows to be displayed on the lane guidance map, wherein the selection is made in accordance with a number of outgoing roads extending from an intersection defined by the acquired map data and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using road classes of the incoming road and the outgoing roads;

determine the direction of the arrow to be displayed in the lane guidance map in accordance with the selected determination process; and displaying the arrows representing the direction of the lanes of the outgoing roads on the lane guidance map in accordance with a result of the determination.

8. A lane information display method of displaying arrows on a lane guidance map by a display device of a navigation system, the arrows representing direction of lanes in outgoing roads which extend from an intersection, the method comprising steps of:

acquiring map data;

selecting one of determination processes to determine direction of arrows to be displayed on the lane guidance map, wherein the selection is made in accordance with a number of outgoing roads extending from an intersection defined by the acquired map data and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using road names or numerical identifier of the incoming road and the outgoing roads;

determine the direction of the arrow to be displayed in the lane guidance map in accordance with the selected determination process; and displaying the arrows representing the direction of the lanes of the outgoing roads on the lane guidance map in accordance with a result of the determination.

9. A lane information display method of displaying arrows on a lane guidance map by a display device of a navigation system, the arrows representing direction of lanes in outgoing roads which extend from an intersection, the method comprising steps of:

acquiring map data;

selecting one of determination processes to determine direction of arrows to be displayed on the lane guidance map, wherein the selection is made in accordance with a number of outgoing roads extending from an intersection defined by the acquired map data and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using the number of the outgoing roads;

determine the direction of the arrow to be displayed in the lane guidance map in accordance with the selected determination process; and displaying the arrows representing the direction of the lanes of the outgoing roads on the lane guidance map in accordance with a result of the determination.

10. A lane information display method of displaying arrows on a lane guidance map by a display device of a navigation system, the arrows representing direction of lanes in outgoing roads which extend from an intersection, the method comprising steps of:

acquiring map data;

selecting one of determination processes to determine direction of arrows to be displayed on the lane guidance map, wherein the selection is made in accordance with a number of outgoing roads extending from an intersection defined by the acquired map data and connection angle between the outgoing roads and an incoming road coming into the intersection, wherein the direction of the arrows represent direction of lanes in the outgoing roads, and wherein the determination processes include a determination process using connection angles between the incoming road and the outgoing roads and another determination process using connection relations among the outgoing roads;

determine the direction of the arrow to be displayed in the lane guidance map in accordance with the selected determination process; and displaying the arrows representing the direction of the lanes of the outgoing roads on the lane guidance map in accordance with a result of the determination.

* * * * *